United States Patent Office 2,881,152
Patented Apr. 7, 1959

2,881,152

ALKYLENEUREA-THIOUREA CONDENSATES

Robert C. Conn, Bound Brook, N.J., Clement L. Kosloski, Bennington, Vt., and Roy H. Kienle, Riverside, Conn., assignors to American Cyanamid Company, New York, N.Y., a corporation of Maine No Drawing. Application April 26, 1955
Serial No. 504,114

19 Claims. (Cl. 260—67.5)

This invention relates to certain aldehyde condensates of thiourea and an alkyleneurea, as well as the preparation of these novel resins and their employment as textile finishes.

A wide variety of water-soluble resinous compositions has been used or suggested for treating textiles. As might be expected, resins which have some excellent characteristics frequently also possess undesirable properties. Thiourea-formaldehyde condensates are known to impart a flame-resistant finish to fabrics made from linear super polyamide yarns of which nylon is of widespread commercial importance. Unfortunately, these water-soluble resins have very poor stability against precipitation and hydrophobing, especially in concentrated form. Consequently, it has been necessary to prepare these materials shortly before their use; and this has greatly limited their commercial application, inasmuch as few textile finishing plants are equipped with suitable apparatus and competent personnel for the manufacture of resins. As a result, there is a considerable demand for stable water-soluble and water-dilutable thiourea-formaldehyde resins. Dimethylol ethyleneurea is widely used in the industry to provide shrink resistance and wrinkle recovery, along with a pleasing hand or feel, but the treatment of various fabrics with this material does not increase their flame resistance appreciably.

An object of the invention is to provide stable water-soluble resinous compositions.

A further object of the present invention is to provide an efficient process for preparing aldehyde condensation products of thiourea and alkyleneurea.

Another object of the invention is to provide an improved process for finishing textiles.

A still further object of the invention is to provide textiles having improved finishes.

An additional object of the invention is to provide an improved flame-retardant finish for nylon fabrics.

Other objects and advantages of the present invention will be apparent to those skilled in the art, especially after consideration of the detailed disclosure hereinbelow.

It has been found that aqueous solutions of thiourea-aldehyde resins may be stabilized against precipitation or hydrophobing by admixture with an aqueous solution of one or more alkyleneurea-aldehyde condensates. The effect is more pronounced in concentrated aqueous solutions, and this is of major importance since a preponderance of textile resins are stored and sold in this form. The effect appears to be specific, as other textile finishing compositions such as melamine-formaldehyde and urea-formaldehyde resins have no significant stabilizing effect on aqueous thiourea-formaldehyde condensates at temperatures of the order of 65° F. and higher.

The invention, accordingly, comprises stable water-soluble and water-dilutable aldehyde condensation products of one or more alkyleneureas and thiourea, including such condensates which have been further reacted with a water-soluble aliphatic monohydric alcohol and their preparation. The invention includes both simple physical mixtures of these thiourea and alkyleneurea condensates, as well as those prepared by the novel process described hereinbelow of reacting the alkyleneurea and thiourea together with an aldehyde. Other aspects of the invention are concerned with a treatment of fibrous materials with these condensation products to impart a desirable finish thereto and especially to the impregnation of nylon of both the adipamide and caprolactam types to impart a flame-retardant finish, as well as the resulting treated textile materials.

In order to obtain good stability against precipitation on storage and hydrophobing upon dilution with, say, 50 volumes of water at 20° C., about 1 to about 10 mols of the alkyleneurea should be taken per mol of thiourea in preparing the condensates, and from about 2.3 to about 5 mols of alkyleneurea appear to produce the maximum stability in the compositions. It will be understood that such quantities are expressed herein in proportions relating to the monomeric alkyleneurea and thiourea taken or charged in preparing the material, even though probably substantially all of the aforesaid urea derivatives are actually present in the water-soluble condensation products as compounds containing combined formaldehyde, or alkoxyalkyl radicals or possibly molecules containing both a thiourea and an alkyleneurea residue. Unless otherwise qualified herein, the expressions "aldehyde condensation products" and "condensates" are used in their broad sense to include not only products of the reaction of the alkyleneureas or thiourea or both with an aldehyde but also those resulting from the further reaction of such products with the above-mentioned alcohols. In addition, while these expressions are pluralized for the most accurate description possible with the present understanding of the invention, it is intended that they include any single reaction product in which thiourea and one or more alkyleneureas are combined in a single compound by a reaction of the type set forth hereinbelow.

The alkyleneureas suitable for use here are heterocyclic. The most important and useful members of this class are ethyleneurea which has the formula:

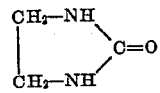

propyleneurea corresponding to the formula:

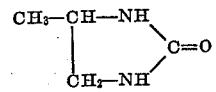

and trimethyleneurea of the following structural formula:

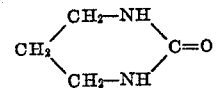

Ethyleneurea is greatly preferred in view of its ready availability and low cost.

In preparing the hydrophilic condensates, a wide variety of water-soluble aldehydes may be employed, including formaldehyde, acetaldehyde, propionaldehyde, glyoxal and the like. Formaldehyde is preferred for the purpose, especially in its more concentrated form, such as paraformaldehyde and hexamethylene tetramine in order to minimize the amount of water introduced into the mixture and, accordingly, reduce the amount of vacuum distillation necessary where a highly concentrated product is sought. However, formalin or other formaldehyde-engendering substances may be substituted. The expression "formaldehyde" is used herein in a generic sense to denote not only formaldehyde but also its polymers, formaldehyde-engendering substances and other formaldehyde equivalents, inasmuch as these all form formaldehyde momentarily during the condensation reaction. In order to avoid obnoxious fumes from the open pad baths conventionally employed in textile finishing plants and also to obviate an unpleasant odor in fabrics impregnated and cured with the present compositions, it is highly desirable to restrict the total aldehyde content of the compositions described herein to the range between about 1.0 and about 2.3 mols per mol of the total of alkyleneurea plus thiourea charged.

The preparation of thiourea-aldehyde resins and alkyleneurea-aldehyde condensates is well known and need not be described here. However, when both of the urea derivatives are reacted with an aldehyde together, the pH should be between about 7.0 and about 11.0, values in the range from 8.5 to 10.5 being preferred. The temperature of this exothermic reaction should be held above about 45° C. for a period of about 10 minutes to about 3 hours, so long as there is no hydrophobing of a sample when diluted with 50 volumes of water at 20° C. For a clear product, the addition of a decolorizing agent such as activated charcoal or a filter aid such as diatomaceous earth or both followed by a filtration step will often be found desirable.

It has been postulated that in reacting ethyleneurea, thiourea and formaldehyde in a single operation, methylol derivatives of the two amides are formed which are then linked through a methylene bridge formed in a subsequent condensation of the following possible nature:

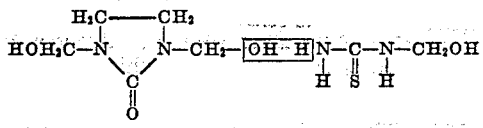

Other condensation reactions are also possible. Although there is some evidence of the formation of a cocondensate of the alkyleneurea and the thiourea in the above reaction from infra-red absorption spectra and the apparently greater stability of products condensed together rather than separately with an aldehyde, this evidence is not conclusive. Accordingly, the present invention is not limited to any particular theory of reaction.

The present compositions also include condensates of the nature described above which are further reacted with a water-soluble monohydric aliphatic alcohol, as exemplified by methanol, ethanol, propanol, and isopropanol, as well as mixtures thereof. Higher alcohols are unsatisfactory since they decrease the hydrophilic characteristics of the agents described herein. Methanol is preferred for the purpose by reason of its low cost and the desirable properties of the resulting products. It is believed that the alcohol reaction is an etherification or alkylation reaction with the aldehyde condensates. Although the aldehyde condensates may be prepared separately and one or both of them separately reacted with the alcohol, it is highly preferable to carry out the alcohol treatment of the thiourea-formaldehyde resin in the presence of an alkyleneurea-formaldehyde condensate, as a wider range of reaction conditions including more severe conditions may be used. With the mixture, a pH range between about 2 and about 6 is suitable, and the alcohol reaction temperature may extend from 45° C. up to any temperature including reflux and above which will not decompose the condensates. On the other hand, reacting methanol with aqueous hydrophilic thiourea-formaldehyde condensates alone requires a pH of 4.5 to 5.6 and a reaction temperature between 45 and 65° C. The reaction time may vary in either case from about 15 minutes to about 3 hours depending upon the particular conditions selected, and over-reaction both here and in the aldehyde condensation stage may be avoided by withdrawing frequent samples for a check for hydrophobing upon dilution. If hydrophobing is encountered in the sample, the reaction time should be decreased from 20 to 80% and preferably about one-third. For each mol of thiourea plus alkyleneurea taken there should be at least about 0.4 mol of the alcohol, and preferably between about 0.8 and about 8.0 mols. Larger proportions of alcohol appear to be harmless but merely increase the amount of volatile material which must be removed in concentrating the agents described herein. The alcohol-reacted products appear to have slightly better stability against hydrophobing than the unetherified material.

There are a number of benefits which accrue to the present invention in addition to those mentioned above. Good flame resistance on nylon is obtained with a lower amount of thiourea deposited thereon than is the case with mixtures of thiourea resins and other textile resins. In addition, there is far less tendency toward the yellowing of a nylon containing a brightener which results from a treatment with a thiourea-formaldehyde resin alone. In the case of cotton, rayon and cellulose acetate fabrics, an outstanding degree of wrinkle recovery is obtained by the present treatments; and the chlorine-retention characteristics of the cured resin are such that exposure to a chlorine bleach followed by scorching produced no further loss in tensile strength in comparison with a scorched resin-treated sample of the fabric which was not washed in a chlorine-containing solution.

The present process is suitable for producing a number of effects on various fibrous materials. It is particularly designed to produce a crisp, durable, fire-retardant finish on net or other open-mesh fabrics containing at least a substantial (e.g., 20% by weight) and desirably a major proportion of at least 50% of linear superpolyamide fibers. While the application of the present resins with magnesium chloride or any of the conventional acid curing catalysts is contemplated for any fibrous textile materials, including inter alia, cotton, viscose rayon, cuprammonium rayon, wool, polyester fibers, as exemplified by cellulose acetate and polyethylene glycol terephthalate, and the various known homo- and copolymers of acrylonitrile with compatible monomers, including 2-methyl 5-vinyl pyridine, other vinyl pyridines, vinyl acetate, and methyl acrylate, and blends of such materials in order to provide an improved hand, wrinkle recovery, shrink resistance, etc., little or no flame resistance is produced by the finish on these fabrics.

The usual method of producing a crisp finish on nylon nets has been a comparatively heavy treatment with a conventional thermosetting resin such as urea- or melamine-formaldehyde. Unfortunately, this increased the combustility of the fabrics since the resin-treated nylon fibers do not melt when burning and drop away from the fabric as in the case of an untreated nylon net fabric. Thus, the prior art treatments served to preserve the structure of the flaming fabric and thereby aid in the propagation of flame through the open-mesh material. The present process produces flame-retardant nylon nets which melt when held in a flame and accordingly do not leave an open, lacy structure suitable for spreading the flame.

When a crisp hand is sought on such nets and other lacy fabrics, it is recommended that the add-on or pickup of the resin solids employed here should amount to at least about 30% based on the untreated fabric weight, whereas 5 to 20% is adequate for various tightly woven or knitted nylon materials. While the novel finishing process is chiefly intended for application to woven or nonwoven textile fabrics, including knitted and felted materials, it is also contemplated that it may be applied to raw fibers, roving, yarns, and threads at any stage in their manufacture.

The incorporation of one or more of the various known acid and latent acid accelerators or catalysts, including diammonium hydrogen phosphate, oxalic acid, ammonium sulfate, etc., in the treating solution is strongly recommended in commercial operations to expedite curing the novel agents to the water-insoluble state. The stability of the present resins in the presence of these accelerators is more than twenty-four hours which is ample for textile-finishing purposes. A halide salt, which expression is used herein in its general sense to also include hydrohalide salts, is preferred, especially when nylon is being treated for maximum flame resistance. Among the suitable catalysts are the amine and alkylolamine hydrochloride and hydrobromide salts, as exemplified by the hydrochloride salt of mixed isopropanolamines, and the hydrochloride salt of 2-methyl 2-aminopropanol-1, as well as a wide variety of the bromides and chlorides of metals and especially those in group II of the periodic table of elements. Magnesium chloride, ammonium chloride and ammonium bromide are especially recommended; but zinc bromide, magnesium bromide, calcium bromide, strontium bromide, and barium bromide can also be employed. The accelerator is generally used in quantities ranging from about 0.5 to about 30%, based on the weight of resin solids, and desirably between 4 and 20%.

Conventional equipment may be employed in impregnating and curing the resin blends on the various textile materials. A pad bath is recommended for the application of the resin, and this bath is desirably maintained at a temperature between 40 and 100° F. The degree of treatment is controlled in known manner by suitable adjustment of the bath concentration and the pressure exerted on the squeeze rolls. For a flame-retardant finish, the thiourea content of the resin applied to the fabric should be at least 2% based on the dry untreated weight of light-weight open-mesh nylon-containing fabrics; and the recommended range is 5 to 20%. Where a stiff hand is sought on such fabrics, the total dry resin add-on should amount to at least 20% of the fabric weight and desirably more than 50%. While dry pick-ups of 100% and more are also contemplated, it is not thought that such heavy deposits will often be desirable in commercial usage. Such treatments require a relatively concentrated pad bath when a conventional 80 to 100% wet pick-up is used; and this points up the need for the outstanding stability of the present agents for long periods at high concentrations. Where a tightly woven or knitted nylon fabric is being treated, the resin deposit on the cloth may amount to between 1 and 40% of the fabric weight; larger pickups increase the fire resistance of the fabric at least in the lower part of the stated range. The content of thiourea, substantially all of which is in combined form, in such resin deposits will amount to at least 0.1% of the untreated cloth weight. For finishes on other textile materials, the total resin add-on may range from 1% upward depending on the effects desired.

The impregnated textile material is dried and cured in the usual manner to the water-insoluble state, and these operations are frequently combined for simplicity. In order to cure the resin blend, it is recommended that the fabric be exposed to temperatures of between 250 and 400° F. for a period of 0.5 to 5 minutes. Radiant heating at temperatures up to 900° F. is contemplated for curing light-weight fabrics in as little as 5 seconds. The actual temperatures attained by the fabric in brief radiant heat curing operations are not significantly higher than those reached in curing at oven temperatures of 350° F. For a better understanding of the nature and objects of the invention, reference should be had to the following illustrative examples in which all proportions are set forth in terms of weight unless otherwise specified.

*Example I*

A three-necked flask is equipped with a stirrer, thermometer, and a reflux condenser and then charged with 1.86 gram mols of ethyleneurea, 0.70 mol of thiourea, 75 ml. of water, 5.11 mols of 37% aqueous formaldehyde with constant stirring throughout the treatment described herein. The pH is adjusted to 9.5 by adding a 5 normal solution of sodium hydroxide in water whereupon an exothermic reaction occurs which raises the temperature of the reaction mass to 60° C. without the application of heat from any external source. The reaction mixture gradually cools to 30° C. over a period of about 45 minutes, and activated charcoal is stirred into the reaction mixture near the end of this period; then the resin solution is filtered. It is often desirable to add a filter aid along with the charcoal to speed up the filtration.

A portion of the clear filtrate is then concentrated to a concentration of 82.7% by weight of solids by vacuum distillation at temperatures below 60° C. The resulting liquid has a thiourea content of 14.48% by weight, and 25.3% of the formaldehyde charged is present as methylol formaldehyde.

After storage for one week at 50° C., there is no separation of the concentrated product and it does not hydrophobe upon infinite dilution with water.

*Example II*

Example I is repeated except for the concentration step to produce a clear resin syrup and dilute hydrochloric acid is added to lower the pH from 9.4 to 4.5. Next, 3.8 mols of methanol are added, and the clear solution heated at 40° C. on a water bath for one hour. A dilute aqueous solution of sodium hydroxide is stirred in to raise the pH to 7.0, and this prevents any further reaction at relatively low temperatures.

The solution is then concentrated under vacuum by gentle heating to temperatures not exceeding 60° C. to yield a clear viscous syrup containing 79.7% solids. An analysis of this product indicates that 7.2% of the total formaldehyde is present as methylene formaldehyde which tends to show that slightly more htan 60% of the molecules of the product contain a methylene bridge.

After storing the concentrated solution for ten days at 50° C., it is observed that there is no separation in the sample and no hydrophobing occurs upon dilution with water.

*Example III*

The procedure of Example I is duplicated without change except for the use of the following quantities of reactants:

1.86 mols of ethyleneurea
0.53 mol of thiourea
4.77 mols of formaldehyde

The same results are obtained in stability tests conducted in the manner described above.

*Example IV*

An unconcentrated clear resin syrup prepared according to Example III is reacted with 3.8 mols of methanol at 40° C. for one hour after the pH is reduced to 4.5 by the addition of dilute hydrochloric acid. Aqueous caustic soda is employed to neutralize the reaction mixture, and vacuum distillation at temperatures maintained below 60° C. is used to produce a clear syrup of about 80% solids content.

*Example V*

The procedure of Example I is followed again with the following amounts of reactants:

1.63 mols of ethyleneurea
0.80 mol of thiourea
4.85 mols of formaldehyde

A clear resin syrup is obtained, which is concentrated to approximately 80% by weight of solids.

*Example VI*

The product of Example V is treated with 3.8 mols of methanol, and dilute hydrochloric acid is employed to adjust the pH to 4.5 before heating at 40° C. for one hour. Dilute sodium hydroxide is used as before to raise the pH to 7.0. After concentrating one portion of the resin syrup by vacuum distillation in the manner described hereinabove to produce a viscous solution containing 80% solids, the product is stored for ten days at 50° C. It is found that no separation occurs in the concentrated test sample and that there is no hydrophobing when this sample is infinitely diluted with water.

*Example VII*

A thiourea resin syrup is prepared by charging 50.4 parts of thiourea, 23.8 parts of formaldehyde as paraformaldehyde, 22.1 parts of methanol and 3.7 parts by weight of water to apparatus of the type disclosed in Example I. Then, a sufficient quantity of dilute aqueous sodium hydroxide is added to raise the pH to 8–9 and the mass is reacted at 50 to 55° C. for two hours. Sufficient formic acid is added to lower the pH to 5.1 and reaction at 50 to 55° C. is continued for another hour. Upon neutralizing and filtering the reaction product a clear liquid is obtained. A stable mixture is obtained by blending 28.2 parts by weight of the above syrup and 70.0 parts of a commercial 50% aqueous solution of dimethylol ethyleneurea, which has a total formaldehyde content of about 1.74 mols per mol of ethyleneurea.

*Example VIII*

Another stable fire-retardant agent for textile finishing is prepared by blending the same substances described in Example VII in a different ratio; namely, 7.3 parts of the thiourea resin syrup to 90.9 parts of the dimethylol ethyleneurea solution.

*Example IX*

A treating bath is prepared with 30.3 kilograms of the concentrated resin syrup of Example I, 3 kilograms of magnesium chloride (anhydrous basis), and sufficient water to bring the volume up to 50 liters. A net fabric woven from nylon fibers (adipamide type) is passed through this solution and extracted in squeeze rolls to give a 100% wet pickup before drying at 90° C. and curing at 148° C. for three minutes. The material is found to have a crisp, pleasant hand, which is not as harsh as that imparted by treatment with a commercial finishing resin containing a blend of alkylated thiourea-formaldehyde with a partially polymerized urea-formaldehyde resin. A simple arbitrary flammability test is applied to a piece of the treated fabric. This consists of rolling up a 4-inch square swatch of the treated material into a relatively tight cylinder and applying a lighted match to the center of the roll while the ends are held. After the roll has burned through, the match is withdrawn; and it is observed that there is no afterflaming. Upon application of the same test to a piece of the same nylon net bearing the same total add-on dimethylol ethyleneurea alone with the same catalyst, the treated fabric continues to burn after the match is withdrawn.

*Example X*

A more dilute pad bath suitable for the treatment of the more common woven fabrics is made up from 24.1 kilograms of the concentrated resin syrup of Example I and 3 kilograms of magnesium chloride dissolved in sufficient water to bring the total bath volume to 200 liters; this provides a resin solids concentration of 10% by weight. Cellulose acetate, viscose rayon and 80 x 80 cotton percale fabrics are padded through this bath, squeezed to retain a wet pickup of about 100% of the solution, dried at about 85° C., and cured at 150° C. for about three minutes. Although none of the three fabrics displays any substantial increase in flame resistance, all possess an excellent and high degree of wrinkle recovery.

*Example XI*

The same nylon net is padded through a solution containing 40% resin solids and prepared by thoroughly mixing 25 kilograms of the resin syrup of Example II and 3 kilograms of magnesium chloride together with sufficient water to make 50 liters of the bath. The treatment is carried out as described in Example IX and produces treated fabrics of similar hand and resistance to afterflaming.

*Example XII*

The pad bath of Example XI is further diluted to 10% solids content and employed in treating cellulose acetate, viscose rayon and cotton percale fabrics with the squeeze rolls adjusted for 100% wet pickup. These materials are dried at approximately 85° C. and cured at 150° C. for about three minutes. The treated fabrics are found to have properties like those of Example X.

*Example XIII*

A pad bath of about 40% resin solids concentration is prepared by mixing 24.1 kilograms of the concentrated resin syrup of Example III and an aqueous solution of 3 kilograms of magnesium chloride with sufficient water to provide a bath volume of 50 liters. When the same nylon net is padded through this bath and processed in the same manner as in Example IX, the treated fabric is observed to have substantially the same hand and excellent resistance to the propagation of flame.

*Example XIV*

Nylon net is also padded through a bath prepared from 25 kilograms of the concentrated alcohol-reacted syrup of Example IV, 3 kilograms of magnesium chloride and sufficient water to total 50 liters. The hand and flame resistance of the fabric are found to be quite similar to that of the treated fabric of Example IX.

*Example XV*

The procedure of Example IX is repeated with the same nylon net and a bath made up to 50 liters with 25 kilograms of the concentrated resin syrup of Example V, 3 kilograms of magnesium chloride and sufficient water. The application of the solution is made in the manner described in Example IX, and similar results are obtained.

*Example XVI*

The same nylon net is processed according to the procedure of Example IX through a bath of about 49% resin solids content which is prepared by mixing 36.1 kilograms of the concentrated resin syrup of Example VI, 3 kilograms of magnesium chloride and sufficient water to bring the solution to a volume of 50 liters. Again, the treated fabric is observed to have an excellent crisp hand and no tendency toward afterflaming in the arbitrary flammability test.

*Example XVII*

Cotton percale (80 x 80) is padded through a bath containing 7.8% of an 80% resin syrup of the same composition as in Example I and 0.75% magnesium chloride, the balance being water. The wet pickup is 80% and after drying the treated fabric, it is cured for two minutes at 350° F. The treated material is found to have an excellent wrinkle recovery amounting to 254° in comparison with a value of 141° for the untreated material. In addition, there is no tensile strength loss resulting from exposure of the treated fabric to chlorine-containing bleaches as indicated by the same tensile strength values obtained with a piece of the treated material which was only scorched and that of the treated material which was subjected to washing in a solution containing a chlorine bleach and then scorched.

*Example XVIII*

Nylon netting is padded to a 100% wet pickup through a solution of 61.5 parts of the 80% resin syrup prepared according to Example I, 36.7 parts of water, and 1.8 parts of an aqueous catalyst solution containing 24.6% of mixed isopropanolamines and 17.6% hydrochloric acid (22° Baumé). Drying and curing is carried out in a single operation by exposure to oven temperatures of 340° F. for 75 seconds. The treated fabric passes the

Example XIX

To 98.2 parts of the product of Example VII is added 1.8 parts of the aqueous isopropanolamine hydrochloride catalyst described in Example XVIII. This solution is applied to nylon net in exactly the same manner described in Example XVIII and the treated fabric has a thiourea content of 14.1% based on the dry untreated fabric weight. In addition to meeting the flammability test of Example IX, the treated material is found to have an excellent crisp hand.

Example XX

A treating bath is made up of 98.2% of the resin mixture of Example VIII and 1.8% of the aqueous isopropanolamine hydrochloride catalyst described in Example XVIII. The same nylon net is processed in the manner described in Example XVIII and has a content of only 3.6% of thiourea based on the untreated material. However, it passes the flammability test of Example IX and has a pleasing hand.

This example is repeated with a pad bath containing the same weight of water-soluble partially polymerized urea-formaldehyde resin. The resulting fabric has an extremely stiff hand and continues to burn after the match is withdrawn in the test described in Example IX.

Example XXI

The procedure of Example I is followed in reacting 5.0 mols of trimethyleneurea, 12 mols of 37% aqueous formaldehyde and 1 mol of thiourea. The resin syrup is concentrated to 80% solids, as described hereinbefore, and found to possess the same stability as the concentrated product of Example I.

A second batch is also prepared. It is treated with 9 mols of methanol according to the procedure of Example II and then is concentrated.

Separate pad baths of both the unalkylated and the alkylated resins are formulated in the manner described in Example IX, and nylon net fabrics are treated as described there. The flammability of each sample, as well as its hand, is found to be very similar to the results obtained in Example IX.

Example XXII

The procedure of Example I is repeated in reacting 1.5 mols of propyleneurea, 5.0 mols of aqueous 37% formaldehyde and 1 mol of thiourea. The resulting resin syrup is concentrated to 80% solids and found to possess stability of the same order as the concentrated product of Example I.

A second batch of the same preparation is produced. This material is treated with 3.8 mols of methanol according to the procedure of Example II before it is concentrated.

Separate pad baths of both the unalkylated and the alkylated resins are formulated in the manner described in Example IX, and nylon net fabrics are treated therein. The flammability of each sample, as well as its hand, is found to be very similar to the results obtained in Example IX.

While there are above disclosed only a limited number of the embodiments of the process and the product of the invention hereinpresented, it is possible to produce still other embodiments without departing from the inventive concept hereindisclosed; and it is, therefore, desired that only such limitations be imposed on the appended claims are are stated therein.

What we claim is:

1. A composition of matter which comprises a stable, water-soluble and water-dilutable condensation product of formaldehyde and a mixture of an alkylene urea selected from the group consisting of ethylene urea, propylene urea, and trimethylene urea, and thiourea, prepared at a temperature above about 45° C., and at a reaction time of between about 10 minutes and about 3 hours, wherein the alkylene urea to thiourea mole ratio is from between about 1 to about 10 to 1, respectively, and wherein the formaldehyde content is from between about 1 and about 2.3 moles per mole of said alkylene urea plus thiourea content prior to condensation.

2. A composition of matter comprising the product of alkylating in the presence of an acid catalyst the composition of claim 1 with a monohydric aliphatic alcohol containing 1 to 3 carbon atoms.

3. A composition of matter according to claim 1 in which said alkylene urea is ethylene urea.

4. A composition of matter comprising the product of methylating in the presence of an acid catalyst the composition of claim 3.

5. A composition of matter according to claim 1 in which said alkylene urea is propylene urea.

6. A composition of matter according to claim 1 in which said alkylene urea is trimethylene urea.

7. A process which comprises condensing at a pH between about 7 and about 11, and at a temperature above 45° C. for a period of time between about 10 minutes and about 3 hours, formaldehyde with a mixture of an alkylene urea selected from the group consisting of ethylene urea, propylene urea, and trimethylene urea, and thiourea, to form a formaldehyde condensation product, said condensation product containing from between about 1 and about 10 moles of alkylene urea per mole of thiourea prior to condensation, and from between 1.0 and about 2.3 moles of formaldehyde per mole of alkylene urea plus thiourea, whereby stable, water-soluble and water-dilutable condensates are prepared.

8. A process according to claim 7 in which the alkylene urea is ethylene urea.

9. A process according to claim 7 in which the alkylene urea is propylene urea.

10. A process according to claim 7 in which the alkylene urea is trimethylene urea.

11. A process which comprises reacting the stable formaldehyde condensates of a mixture of an alkylene urea selected from the group consisting of ethylene urea, propylene urea and trimethylene urea, and thiourea, wherein the alkylene urea content prior to condensation was between about 1 and about 10 moles per mole of thiourea content prior to condensation, and wherein the formaldehyde content prior to condensation was between about 1 and about 2.3 moles per mole of alkylene urea plus thiourea, with at least 0.4 mole of a water-soluble aliphatic monohydric alcohol containing from 1 to 3 carbon atoms per mole of alkylene urea plus thiourea, prior to condensation with formaldehyde, at a pH between about 2 and about 6 and at a temperature above about 45° C. for a period between about 15 minutes and 3 hours to produce stable and water-dilutable condensation products.

12. A process which comprises condensing formaldehyde with a mixture of an alkylene urea selected from the group consisting of ethylene urea, propylene urea and trimethylene urea, and thiourea, wherein said alkylene urea was present in said mixture in an amount of from between about 1 and about 10 moles per mole of thiourea, and wherein said formaldehyde is present in an amount of between about 1 and about 2.3 moles per mole of alkylene urea plus thiourea, prior to condensation, condensing at a pH of between about 7.0 and about 11 at a temperature above about 45° C. for a period of time between about 10 minutes and 3 hours and thereafter reacting the resulting product with at least 0.4 mole of a water-soluble aliphatic monohydric alcohol containing from 1 to 3 carbon atoms per mole of alkylene urea plus thiourea content, prior to formaldehyde condensation, at a pH between about 2 and about 6 and at a temperature above about 45° C. for a period of from between 15 minutes and 3 hours to produce stable, water-soluble, water-dilutable condensation products.

13. A process according to claim 12 wherein the alkylene urea is ethylene urea.

14. A process according to claim 12 wherein the alkylene urea is propylene urea.

15. A process according to claim 12 wherein the alkylene urea is trimethylene urea.

16. A process which comprises treating a textile material containing linear super polyamide fibers with an aqueous solution of a composition according to claim 1, drying the treated material and curing the dry treated material by heating to produce a substantially water-insoluble flame-resistant finish.

17. A process which comprises treating a textile material containing linear super polyamide fibers with an aqueous solution of an alcohol-reacted aldehyde condensation product according to claim 1, drying the treated material and curing the dry treated material by heating to produce a substantially water-insoluble flame-resistant finish.

18. A process which comprises treating a textile material containing linear super polyamide fibers with an aqueous solution of a composition according to claim 1 containing ethyleneurea, drying the treated material and curing the dry treated material by heating to produce a substantially water-insoluble flame-resistant finish.

19. A process which comprises impregnating a textile fabric containing linear super polyamide fibers with an aqueous solution of a halide salt curing agent and a composition according to claim 1 in sufficient quantity to provide a thiourea content on the treated fabric of at least about 2 percent based on the weight of untreated dry fabric, drying the impregnated fabric and curing the finish thereon to the substantially water-insoluble state by heating in order to produce a flame-retardant finish.

References Cited in the file of this patent

UNITED STATES PATENTS

| | | |
|---|---|---|
| 2,737,136 | Hoover et al. | Apr. 10, 1945 |
| 2,373,135 | Maxwell | Apr. 10, 1945 |
| 2,613,211 | Hurwitz et al. | Oct. 7, 1952 |
| 2,755,198 | Stewart | July 17, 1956 |